Sept. 8, 1942.  J. KANTOR  2,295,114
BEVERAGE MIXING MACHINE
Filed April 19, 1939   2 Sheets-Sheet 1

INVENTOR.
James Kantor,
BY
Hood & Hahn.
ATTORNEYS.

Sept. 8, 1942.　　　　J. KANTOR　　　　2,295,114
BEVERAGE MIXING MACHINE
Filed April 19, 1939　　　2 Sheets-Sheet 2
Fig. 2.
Fig. 3.
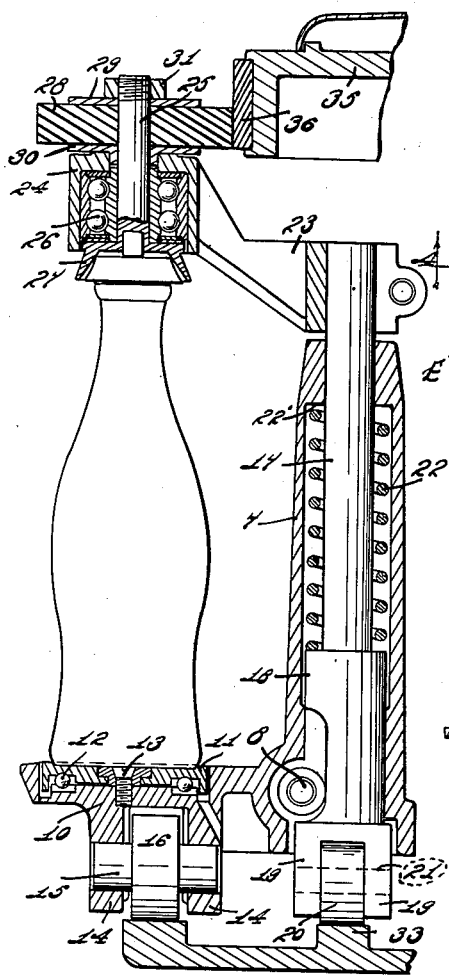
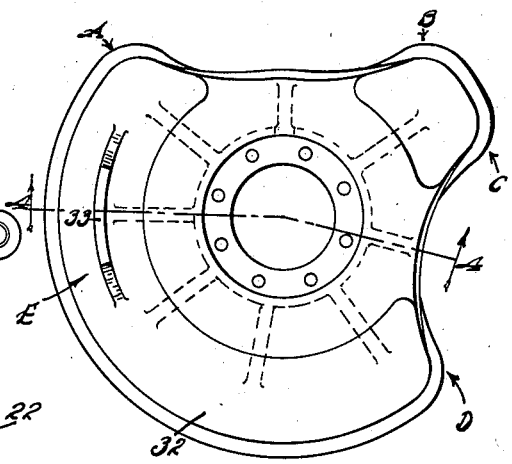
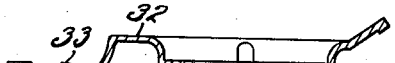
Fig. 4.
INVENTOR.
James Kantor,
BY
Hood & Hahn.
ATTORNEYS.

Patented Sept. 8, 1942

2,295,114

UNITED STATES PATENT OFFICE 2,295,114

BEVERAGE MIXING MACHINE

James Kantor, Chicago, Ill., assignor to The Liquid Carbonic Corporation, Chicago, Ill., a corporation of Delaware Application April 19, 1939, Serial No. 268,729

7 Claims. (Cl. 259—54)

My invention relates to improvements in machines for causing the beverage contents of bottled carbonated beverages and the like to become thoroughly mixed.

According to the present commercial method of filling bottles with carbonated beverages, it is the custom to first introduce into the container or bottle a predetermined quantity of flavored syrup. On top of this, there is deposited sufficient carbonated water to fill the bottle to the determined point. After this filling occurs, the bottle or container is generally capped. In order that the syrup and carbonated beverage shall become thoroughly mixed, the bottle is usually agitated by shaking the same by various means, either hand or machine.

One objection to this method of mixing the contents of the bottle is that, due to the fact that syrup is comparatively thick and heavy, there is a tendency for the syrup to stick or adhere to the sides of the bottle, especially due to the fact that the greatest agitation when the bottle is shaken or oscillated takes place toward the center of the bottle. As a result, there is a certain portion of the syrup which never becomes thoroughly mixed with the carbonated water.

In order to break the syrup from the sides of the bottle, certain machines have been produced which, prior to the delivery of the bottle to the agitating mechanism, spin or rotate the bottle on its vertical axis at a comparatively high rate of speed. Immediately prior to the delivery of the bottle to the oscillating mechanism, the rotation of the bottle is suddenly stopped, permitting the liquid within the bottle to continue its rotation, and this tends to, due to the fact that the bottle is oscillated or shaken while this rotation continues, break the syrup from the sides of the container.

My present invention relates primarily to this type of machine and has for its object the provision of means whereby the container will be alternately rapidly spun on its vertical axis and oscillated during the mixing period.

For the purpose of disclosing the invention, I have illustrated an embodiment thereof in the accompanying drawings, in which:

Fig. 2 is a detailed section of a bottle supporting unit;

Fig. 3 is a plan of the oscillating cam; and

Fig. 4 is a sectional view of the cam taken on the line 4—4 of Fig. 3.

Figure 1:
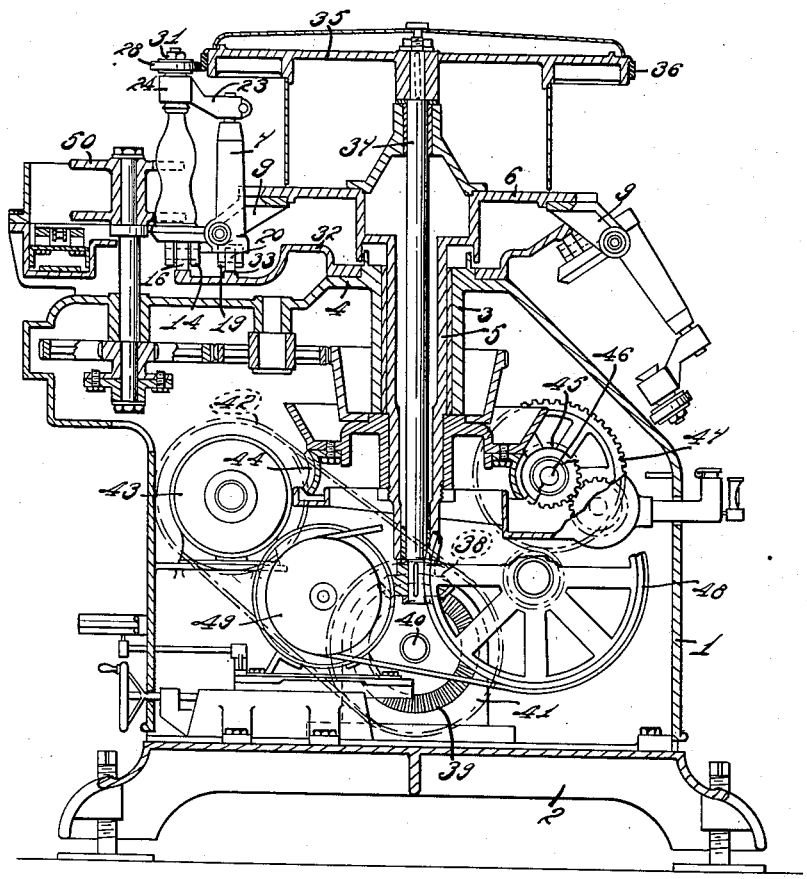
Fig. 1 is a longitudinal sectional view of a machine embodying my invention.

Referring to the drawings, I provide a suitable enclosing casing 1 within which and by which the various parts are adapted to be supported. This casing preferably rests upon a suitable base 2 to which it is adapted to be secured and the casing 1 is provided with a center shaft supporting sleeve 3 carrying a circular cam supporting platform 4. Within this sleeve is rotatably mounted a sleeve 5 supporting at its upper end a circular platform 6 on which are mounted a plurality of bottle receiving holders. As each of these holders is the same construction, a description of one only is necessary. Each of the holders comprises a hollow post 7 pivoted on a transverse pivot pin 8 between a pair of bracket arms 9 extending downwardly and forwardly from the table 6. This post has extending therefrom a bottle platform 10 within the top surface of which is arranged a rotatable bottle table 11. The platform 10 is provided with a round recess in its upper surface to receive the table 11 and between the table and the bottom of this recess, I interpose suitable ball bearings 12. The table is rotatably secured upon the platform 10 through the medium of a center screw 13 passing through a washer and threading into the platform 10. The platform on its under side is provided with a pair of brackets 14 between which is mounted a pivot pin 15 carrying a roller 16, the purpose of which will be more fully hereinafter disclosed.

Reciprocably mounted within the sleeve 7 is a rod or post 17 somewhat enlarged at its lower end 18 and carrying at its bottom a pair of arms 19 between which is mounted a roller 20 on a pivot 21. The rod or post 17 is biased toward its lower position through the instrumentality of a coiled spring 22 interposed between the shoulder formed by the enlarged portion 18 and a shoulder 22' formed on the hollow post 7. The upper end of the post 17 carries a clamping arm 23 having a hollow cylindrical head 24. Rotatably mounted within this cylindrical head 24 is a shaft 25, the thrust of which is taken both laterally and vertically by suitable ball bearings 26 and this shaft 25 carries, at its lower end, a bottle centering bell 27 in axial alignment with the center of the rotatable table 11. The upper end of the shaft 25 carries a friction pinion 28 which is clamped on the shaft between the clamping heads 29 and 30 by a suitable clamping nut 31.

The stationary table 4 carries a cam 32 which is so developed that during the period of intake and discharge of a bottle from the holder, the platform 10 will be maintained in a substantially horizontal position and which throughout its periphery is so arranged that the roller 16 traveling thereon will cause the platform 10 to alternately swing downwardly and again upwardly throughout its rotative travel thereby causing a bottle supported on the platform to oscillate alternately from the vertical through an arc greater than 90 degrees although somewhat less than 180 degrees. This cam 4 also carries on its upper surface a second cam 33 which extends on the table a sufficient distance to be engaged by the roller 20 to raise the clamping head 23 during the intake and discharge of a bottle on to the platform 10 so that the clamping head 23 will be, during this interval, raised sufficiently to permit a bottle to be received on the rotating table 11 and between this table and the centering bell 27, during the intake of the holder and will permit the release of the bottle during the discharge of the same. During the interval between these two points, however, the bottle will be firmly clamped upon the holder, although in such a manner that it will be freely rotatable on its vertical axis.

In order to impart a spinning movement to the bottle, during the intervals in which it is maintained in its vertical position, I provide a spinner wheel 35 provided at its outer periphery with a friction face 36 adapted during the vertical position of the bottle to contact the friction pinion 28. This wheel 35 is mounted upon the upper end of a shaft 37 rotatably supported within the sleeve 5 and having mounted on its lower end a bevel pinion 38 adapted to mesh with a gear 39 mounted on a shaft 40.

This shaft 40 is driven from a suitable speed changing mechanism 41 in turn having a belt drive 42 from a suitable electric driving motor 43.

The platform 6 and its accompanying sleeve 5 is driven independently from the shaft 37 and the friction gear 35. To this end, the sleeve 5 has keyed thereon a worm gear 44 adapted to mesh with a worm 45 driven from the shaft 46 in turn driven by suitable reducing gearing 47. This gearing is driven by a belt drive 48 from a second motor 49. The drives of the table 6 and of the friction gear 35 are such that the table 6, with its accompanying bottle holders, is rotated in a clockwise direction while the friction gear 35 is rotated in a counter-clockwise direction. Therefore, and especially due to the fact that the pinion 28 is comparatively small in diameter, the shaft 25, and with it the bottle, is rotated at a comparatively very high speed during the period which it is maintained in an upright or vertical position, while traveling in its orbit from the intake to the delivery point. In actual practice, I have found it advantageous to spin the bottle at the rate of approximately 1500 R. P. M.

In operation, with the bottle supporting platform 6 and its accompanying bottle holders rotating, the bottle is fed into the bottle holder between the rotating table 11 and the centering bell 27. During this period, the roller 20 is traveling on the cam surface 33 so that the bell 27 will be sufficiently raised to permit the bottle to be deposited on the table 11 beneath the same. As the holder rotates, the roller 20 passes off the cam 33 permitting the bell to grip the top of the bottle. It is to be remembered that during this period, the bottle holder is in vertical or upright position and therefore the friction pinion 28 will be in contact with the friction gear 35 so that the bell 27 will be rotating. As soon as the bell clamps upon the bottle, the bottle will commence to spin and this spinning operation continues until the roller 16 passes beyond the point A of the cam. At this point, the bottle holder commences to dip disconnecting the friction pinion 28 from the friction gear 35 and the bottle is thrown down or oscillated through an arc less than 180 degrees but greater than 90 degrees. As the platform continues to rotate with the roller 16 contacting the cam between the points A and B, the bottle will again commence to raise into vertical position so that between the points B and C, the friction pinion 28 is again in contact with the friction gear 35 again spinning the bottle at a high rate of speed. Between the points C and D, the bottle is again oscillated downwardly and upwardly and from the point D to approximately the point E, the bottle, while in its vertical position, is again spun. At about the point E, the roller 20 engages the cam surface 33 thus disengaging the bottle bell 27 from the bottle and at this point the bottle is taken off the machine by suitable outfeed mechanism similar to the infeed star mechanism 50.

I claim as my invention:

1. In an apparatus for mixing the contents of a container, the combination with a rotary member, of a container supporting element mounted to move on said rotary member in a plane radial to the rotary member, means on said supporting element for supporting the container thereon to rotate on its longitudinal axis, a driven pinion connected to said means, a driving gear concentric with said rotary member, means for repeatedly moving said supporting element in its radial plane to tilt and upright the container thereon, said driving pinion and driven gears being adapted to drivingly engage when the container is moved to its upright position.

2. In an apparatus for mixing the contents of a container, in combination, a rotary member, a container supporting element mounted to move on said rotary member in a plane radial to the rotary member, means on said supporting element for supporting the container thereon to rotate on its longitudinal axis, a driving wheel mounted coaxially with said rotary member, and means on said supporting element movable into engagement with said driving wheel for rotating said container on its longitudinal axis as it is moved in its orbit with said rotary member.

3. In an apparatus for mixing the contents of a container, in combination, a rotary member, a container supporting element mounted to move on said rotary member in a plane radial to the rotary member, said supporting member being adapted during a portion of the movement of the rotary member to support the container with its longitudinal axis extending vertically, a driving wheel mounted coaxially with the rotary member, and means on said supporting element adapted to engage said driving wheel while said container is supported with its longitudinal axis extending vertically for rotating said container on its longitudinal axis.

4. In an apparatus for mixing the contents of a container, the combination with a rotary member, of a container supporting member mounted to move on said rotary member in a plane radial to the rotary member, means on said supporting element for supporting the container thereon to rotate on its longitudinal axis, a driven pinion connected to said means, a driving gear coaxial with said rotary member and adapted to engage said driven pinion during a portion of the rotative movement of said rotary member for rotating the container on its longitudinal axis.

5. In a mixing apparatus, in combination, a rotary member, a container supporting element journalled on said member for tilting movement with respect to said member, a driving wheel mounted coaxially with said rotary member, and means including in said supporting element for engaging said wheel to rotate the container on its longitudinal axis while supporting in said gripping means.

6. In a mixing apparatus, in combination, a base, a rotary table, container supporting elements journalled on said table for tilting movement of a container with respect to said table, said elements including gripping members, one of which is adapted to engage the top of the container, and the other of which is adapted to engage the bottom of the container, a driving wheel mounted coaxially with said table and a driven member carried by one of said gripping members for engaging with said driving wheel to rotate said gripping means to spin the container about its longitudinal axis.

7. In a mixing apparatus, a base, a rotary table, a container supporting element journalled on said table for tilting movement of a container with respect to the table, said element including container gripping means rotatable with respect thereto, a driving wheel mounted coaxially with said table, a driven wheel carried by one of said gripping elements, and means for moving said supporting element to engage said driven wheel with said driving wheel to rotate said gripping means to spin the container about its longitudinal axis.

JAMES KANTOR.